UNITED STATES PATENT OFFICE.

WALTHER FELD, OF LINZ, GERMANY.

PROCESS OF OBTAINING SULFUR FROM HYDROGEN SULFID AND SULFUR DIOXID.

1,079,291. Specification of Letters Patent. Patented Nov. 18, 1913.

No Drawing. Application filed December 23, 1912. Serial No. 738,242.

*To all whom it may concern:*

Be it known that I, WALTHER FELD, a subject of the King of Prussia and German Emperor, of Linz-on-the-Rhine, in the German Empire, have invented new and useful Improvements in Processes of Obtaining Sulfur from Hydrogen Sulfid and Sulfur Dioxid, of which the following is a specification.

In the specification of my United States Letters Patent No. 1,011,043, I describe a process for combining ammonia (alone, or together with sulfureted hydrogen,) with sulfurous acid, the conditions of the process being such that ammonium thiosulfate, polythionate, and sulfate are produced, but no ammonium sulfite, a mode of carrying out that process consisted in treating a polythionate solution alternately first with gases which contain ammonia, sulfureted hydrogen, and then with sulfurous acid.

It is known that if sulfurous acid and sulfureted hydrogen be passed through water, or through certain salt solutions, they are caused to mutually react forming water and sulfur, but the mutual reaction of sulfureted hydrogen and sulfurous acid is incomplete and free acids accumulate in the liquor whereby the reaction is correspondingly further retarded and large amounts of both gases escape the reaction. A complete extraction of sulfureted hydrogen from coal gas, for example, by treating it with sulfurous acid therefore has not been obtained by using this known process. Furthermore, even if the reaction according to the foregoing equation would be complete, it could not be carried out in practice, as it is practically impossible to mix the two components in the ratio required by the said equation. One, or other, of the components will always be in excess and will contaminate the gas. For these reasons all attempts hitherto made to carry out the aforesaid mutual reaction have failed.

I have now found that the presence of a thiosulfate supports substantially the mutual reaction of sulfureted hydrogen and sulfurous acid. In order to complete the oxidation of the sulfureted hydrogen for each two molecular proportions of sulfureted hydrogen, at least one molecular proportion of sulfurous acid (that is for one part by weight of sulfureted hydrogen at least one part by weight of sulfurous acid) must be supplied. Any excess of sulfurous acid does not prejudice the reaction and is completely neutralized by the thiosulfate, mainly polythionate, and occasionally some sulfate, being formed. The polythionate formed will support the extraction of the sulfureted hydrogen.

Although, for the purposes of my present invention, the thiosulfate of any base, or a mixture of such thiosulfates, or of such thiosulfates with other salts, such as sulfates, chlorids, or polythionates, may be used, it is advisable to use alkali thiosulfates, alkaline earth thiosulfates, ammonium thiosulfate, or magnesium thiosulfate. If the gases to be treated also contain ammonia, ammonium thiosulfate is preferably employed. There is no injurious influence on the reaction if the liquor contains sulfate, polythionate, chlorid, or other ammonium salts.

The following example will illustrate how this invention can be carried out, for instance with coal gas, (or with gas from coke ovens) which is to be deprived of sulfureted hydrogen, but I do not limit myself to this particular example.

The gas to be purified is treated in a gas washer with a solution of ammonium thiosulfate. The solution is, simultaneously with, or prior to, being introduced into the gas washer, treated with sulfurous acid, an excess of sulfurous acid being employed. Sulfurous acid which does not enter into reaction with the sulfureted hydrogen, will be neutralized by the thiosulfate and polythionate be thereby formed. The formation of polythionate is of especial advantage when the gas contains ammonia in addition to sulfureted hydrogen. If too much polythionate is formed the liquor which contains the polythionate, and which runs from the washing apparatus, is treated with raw gas which contains sulfureted hydrogen, or ammonia, or sulfureted hydrogen and ammonia. Or the polythionate can be reduced to thiosulfate by treating the liquor with basic, or reducing, compounds such for instance, as ammonia water, or milk of lime, or with soluble, or insoluble, sulfids, or the like.

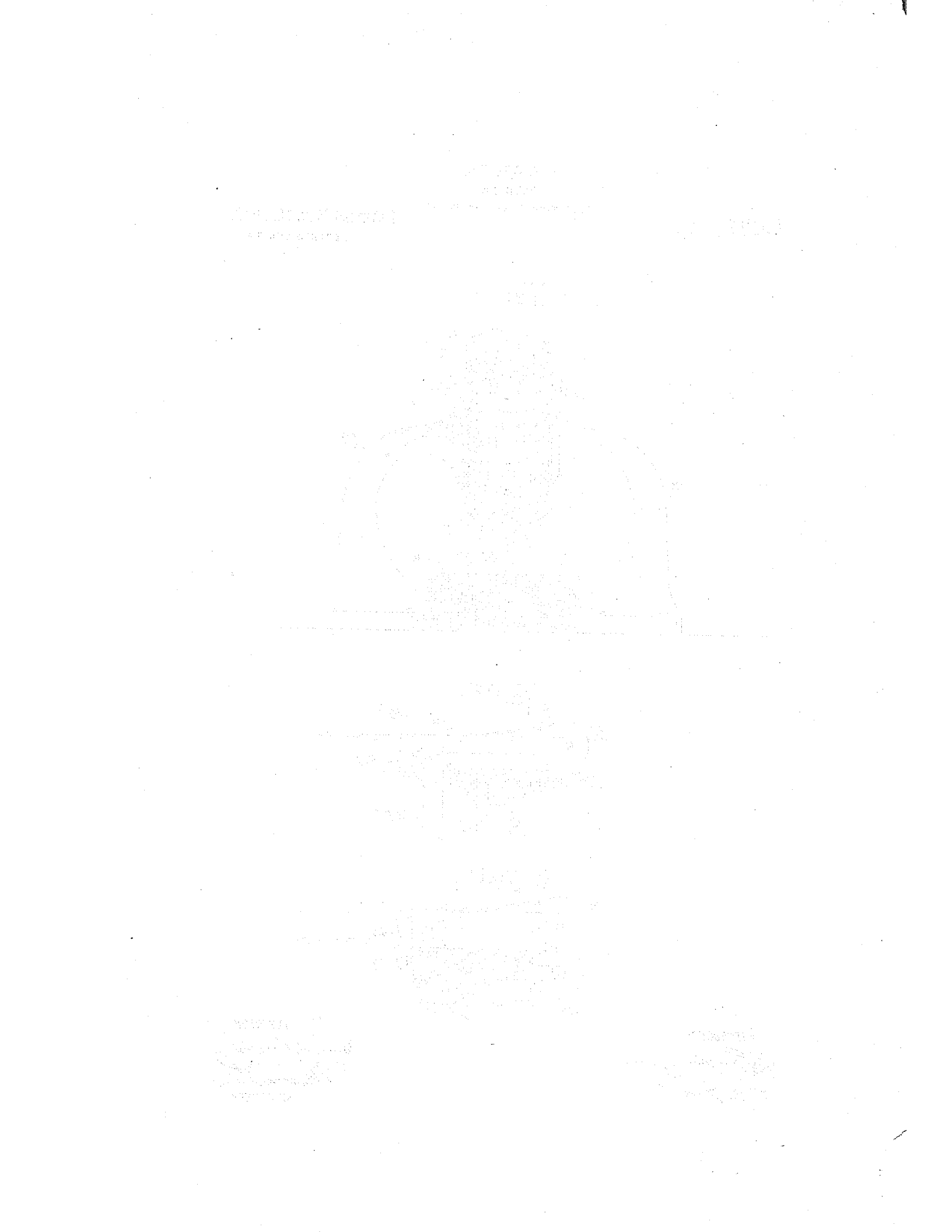

The gases and the solution of thiosulfate entering into mutual reaction may be cold, or hot. When operating at an elevated temperature, it is advisable to avoid, as much as possible, the formation of polythionate, as, under the action of heat, part of the poly-